US012646017B2

(12) United States Patent (10) Patent No.: US 12,646,017 B2
Hellgren et al. (45) Date of Patent: Jun. 2, 2026

(54) METHOD FOR OPERATING AN AUTONOMOUS VEHICLE

(71) Applicant: Volvo Truck Corporation, Gothenburg (SE)

(72) Inventors: Jonas Hellgren, Gothenburg (SE); Christina Hernvall, Gothenburg (SE); Claus Biller, Skövde (SE); Tomas Mörk, Gothenburg (SE); Helena Johansson, Gothenburg (SE)

(73) Assignee: Volvo Truck Corporation, Gothenburg (SE)

( * ) Notice: Subject to any disclaimer, the term of this patent is extended or adjusted under 35 U.S.C. 154(b) by 498 days.

(21) Appl. No.: 17/785,126

(22) PCT Filed: Dec. 20, 2019

(86) PCT No.: PCT/EP2019/086695
§ 371 (c)(1),
(2) Date: Jun. 14, 2022

(87) PCT Pub. No.: WO2021/121624
PCT Pub. Date: Jun. 24, 2021

(65) Prior Publication Data
US 2023/0009869 A1 Jan. 12, 2023

(51) Int. Cl.
| | |
|---|---|
| *G06Q 10/047* | (2023.01) |
| *G01C 21/36* | (2006.01) |
| *G06Q 10/063* | (2023.01) |
| *G06Q 10/20* | (2023.01) |
| *G06Q 30/0601* | (2023.01) |
| *G07C 5/00* | (2006.01) |

(52) U.S. Cl.
CPC ......... *G06Q 10/047* (2013.01); *G06Q 10/063* (2013.01); *G06Q 10/20* (2013.01); *G06Q 30/0611* (2013.01); *G01C 21/3679* (2013.01); *G07C 5/008* (2013.01)

(58) Field of Classification Search
CPC .................................................... G06Q 10/20
See application file for complete search history.

(56) References Cited

U.S. PATENT DOCUMENTS 10,846,660 B2 * 11/2020 Tullimalli ................. B60S 5/06
10,949,831 B1 * 3/2021 Gaudin .............. G06Q 20/3278
(Continued)

FOREIGN PATENT DOCUMENTS

CN 105848981 A 8/2016
EP 2 741 052 A1 * 11/2014
(Continued)

OTHER PUBLICATIONS

First Office Action for Chinese Patent Application No. 201980103005. 8, mailed Jun. 29, 2024, 9 pages.
(Continued)

*Primary Examiner* — Renae Feacher
(74) *Attorney, Agent, or Firm* — Withrow & Terranova, PLLC

(57) ABSTRACT

The present disclosure generally relates to a computer implemented method for operating an autonomous vehicle, specifically in relation to efficient planning of interactions with service providers. The present disclosure also relates to a corresponding control system and computer program product.

17 Claims, 4 Drawing Sheets

(56)          References Cited

U.S. PATENT DOCUMENTS

| | | | | |
|---|---|---|---|---|
| 10,956,995 B1* | 3/2021 | Fleischman | ............ | G06Q 50/14 |
| 2010/0106514 A1* | 4/2010 | Cox | ....................... | G01C 21/20 |
| | | | | 715/764 |
| 2011/0032110 A1* | 2/2011 | Taguchi | .................... | B60L 3/12 |
| | | | | 340/636.1 |
| 2014/0129139 A1* | 5/2014 | Ellison | .............. | G06Q 30/0251 |
| | | | | 701/533 |
| 2015/0278759 A1* | 10/2015 | Harris | .............. | G06Q 10/08355 |
| | | | | 705/338 |
| 2017/0108348 A1* | 4/2017 | Hansen | ................. | H04W 4/024 |
| 2018/0202822 A1 | 7/2018 | DeLizio | | |
| 2019/0064834 A1 | 2/2019 | Adams | | |
| 2019/0095872 A1* | 3/2019 | Lalwani | ............. | G06Q 30/0633 |
| 2020/0250720 A1* | 8/2020 | Schweitzer | ........ | G06Q 30/0643 |

FOREIGN PATENT DOCUMENTS

| | | | | |
|---|---|---|---|---|
| SE | 1650341 A1 | * | 3/2016 | |
| WO | WO 2020112337 | * | 6/2020 | |

OTHER PUBLICATIONS

International Search Report and Written Opinion for International Patent Application No. PCT/EP2019/086695, mailed Jun. 26, 2020, 14 pages.

* cited by examiner

METHOD FOR OPERATING AN AUTONOMOUS VEHICLE

TECHNICAL FIELD

The present disclosure generally relates to a computer implemented method for operating an autonomous vehicle, specifically in relation to efficient planning of interactions with service providers. The present disclosure also relates to a corresponding control system and computer program product.

BACKGROUND

Recently there have been great advances in the semi and fully autonomous operation of a vehicle, effectively providing driver assistance and safety functions, such as adaptive cruise control, pedestrian detection, front and rear collision warning, lane departure warning and general obstacle detection. Such an autonomous vehicle typically makes use of a plurality of sensors that are configured to detect information about an environment surrounding the vehicle. The sensor may for example implement camera vision and radar or LiDAR technologies, possibly fusing the outputs form the sensor for forming an understanding of the vehicle environment.

To ensure that such a vehicle is functioning in a proper manner, it has to be serviced at e.g. regular intervals and/or when a component of the vehicle indicates that it may be malfunctioning. However, since autonomous vehicles inherently lacks continuous human interaction, such as for filling up gas and also assisted in other maintenance issues such as changing a bulb or fuse, checking oil level, checking air pressure in the tires, cleaning windows, etc., the autonomous vehicle must in some implementations by itself ensure that it is properly maintained.

An example of such an implementation is presented in SE1650341A1, disclosing a method for providing service to an autonomous vehicle. Specifically, data is collected from the vehicle and a service need is determined based on the collected data. In case a service need is present, an inquiry is transmitted to a set of service providers and as a response an offer is received from at least one of the service providers. The vehicle may then select the offer best matching e.g. the service needs while at the same time ensuring that a predefined arrival time (such as for goods delivery) is sufficiently maintained.

Even though the solution proposed in SE1650341A1 provides improvements in relation to automated maintenance for an autonomous vehicle, SE1650341A1 is completely silent in regard to how the autonomous vehicle should prioritize its operation to optimize a general operation of the vehicle. As such, there appears to be room for further improvements, where also the mentioned optimization focus is taken into account.

SUMMARY

In accordance to an aspect of the present disclosure, the above is at least partly alleviated by means of a computer implemented method for operating an autonomous vehicle travelling along a predetermined route using a control system, the predetermined route including a predetermined destination and a previously established time for arrival at the destination, the control system comprising a wireless transceiver and an electronic control unit, wherein the method comprises the steps of identifying, using the electronic control unit, a service provider arranged within a predetermined distance from the vehicle, the service provider arranged to provide a service to the vehicle for extending a present operational duration (such as a prolonged operation of the vehicle), establishing, using the wireless transceiver, a networked communication with the service provider, receiving, at the electronic control unit, an offer from the service provider to provide the service, estimating, using the electronic control unit, a delay for amending the route to accept the offer from the service provider, and deciding, using the electronic control unit, if to accept the offer based on a combination of the present operational duration, the previously established time for arrival and the estimated delay.

The present disclosure presents a scheme for matching a "need" for a vehicle (such as e.g. need to be charged, washed, paused or parked e.g. to not arrive too early at the destination, generally maintained or serviced, etc.) with an offer from a service provider, where the service provider is adapted to fulfill the vehicle needs. The service provider may for example be a charging station, a washing station, etc. In line with the present disclosure, the vehicle may preferably be adapted to itself be responsible to ensure that it doesn't end up in a situation where e.g. the battery is (almost) discharged and the charging station is occupied by another vehicle.

In line with the present disclosure, this is achieved by putting specific focus on the step of deciding if to accept the offer or not. Generally, the decision is made based on at least present operational duration (e.g. "how long may the vehicle operate without receiving the service"), a previously established time for arrival (e.g. to not arrive too late) and the estimated delay in case the service is accepted. For example, a transport mission (also below defined as a predefined operational mission) may have a time range defined for when to arrive at the destination. Accordingly, in case the estimated delay will not push the time of arrival outside the time range, then it may be clear-cut to accept the offer. However, the time range may have been selected to ensure that other delays, such as general traffic delays, are accounted for. Thus, the decision making must also take such considerations into account.

Accordingly, in a preferred embodiment of the present disclosure the functionality behind the decision making may include a machine learning component, where the machine learning component has been previously trained on data from a large population of vehicles, for example including historical data relating to the operation of such vehicles. In a specifically preferred embodiment, the machine learning component may also be trained/targeted towards penalizing a situation where the vehicle fails to complete the predefined operational mission, for example within the predefined time range. Accordingly, the machine-earning component is preferably targeted towards balancing a short-term service cost (such as the delay involved with e.g. charging) with the long-term risk of not accepting the offer.

An example of a long-term cost involving electrical vehicles, may be in the case where the state of charge of a battery of the vehicle reaches below a defined lowest charging level. When the battery reaches such a low state of charge, battery stress may occur severely limiting the lifetime of the battery, resulting in that the battery must be changed earlier that what would normally be necessary resulting in an increased cost for the owner of the vehicle. Another example of a long-term cost involving a sensor may be that if the sensor is not being cleaned "in time", it may be that the sensor no longer may be cleaned to again function in a normal manner, also in this case having to be changed before what would normally be necessary resulting in an increased cost for the owner of the vehicle. Failing the predefined operational mission may for example be to not charge the vehicle at an early stage, and then in the end having to wait an undesirable long time to charge at a later stage. Similar examples may for example be illustrated in relation to washing of the vehicle, where a failure may be defined as to not washing the vehicle when needed and thus not being able to continue to drive due to sensors being e.g. covered with dirt (thus not functioning).

Within the context of the present disclosure it should be understood that the expressions "service provider" and "service" should be interpreted broadly. That is, a service provider may in the broadest sense be a function to extend the operational duration for the vehicle, as well as for component(s) and/or cargo comprised with the vehicle.

The method according to the present disclosure may in some embodiments be performed on-board the vehicle, e.g. using an electronic control unit (ECU) comprised with the vehicle. However, at least one portion of the method may in some alternative embodiments be performed using a remote server such as a cloud server, where the cloud server being network connected to an electronic control unit (ECU) comprised with the vehicle.

In an embodiment of the present disclosure the method further comprises the step of operating the vehicle according to the amended route if the offer is accepted. For example, the vehicle is preferable equipped with a wireless transceiver for providing information to the service provider that the offer is accepted, possibly comprising an estimated time of arrival at the service provider. According to such an implementation it may for example be possible for the service provider to "reserve a spot", such as for charging the vehicle. The information may also be used by the service provider for planning the service of the vehicle.

Possibly, the adjusted time for arrival at the destination may also be provided to a server arranged remotely from the vehicle. The server may, as will be further elaborated below, be part of a mission control arrangement possibly adapted to coordinate a vehicle fleet comprising a plurality of autonomous vehicles, for example used for planning handling of the vehicle (and the other vehicles) at the destination. As will be apparent, in case the vehicle will arrive late it may be desirable to allow the mission control arrangement to reschedule e.g. cargo handling at the destination, such that the vehicle is handled in the most desirable manner when arriving at the destination. The server may as such be adapted to perform a real time traffic coordination of the vehicle fleet, at least partly based on the decisions made in relation to the present disclosure.

It should be understood that the server in some embodiments may be allowed to override the decision taken by the electronic control unit comprised with the vehicle, meaning that the server, a function implemented at the server, or an operator in communication with the server, could possibly deny the vehicle the service. Such a decision could for example be taken based on knowledge not available at the vehicle, where the server e.g. in comparison could have more information available.

It is of course advantageous if the decision of if to accept the offer takes into account an estimated schedule of availability of the service, possibly defining a waiting time for receiving the service. Accordingly, since the waiting time may be fluctuating over time, it may be desirable to arrange the functionality behind the decision making to e.g. take into account historical data for receiving a service at different service providers. Thus, it is preferred to balance the time it could take to receive the service now as compared to the time it could take to receive the service at a later stage.

Preferably, the step of deciding if to accept the offer advantageously comprises optimizing the operational duration and/or optimizing an arrival time at the destination. Again, the decision scheme should in line with the present disclosure balance when to arrive with an overall operational duration for the vehicle. For example, it may as such be advantageous to receive the service now to prolong the operational duration, even if the vehicle is arriving late at the destination. That is, it may in some embodiments be desirable to allow the decision making to be dependent not only on a single mission (start to destination) but on a plurality of e.g. consecutive missions. Thus, even if the first mission is slightly late due to the reception of a service, a set of consecutive missions could in total possibly be performed in a better way (as compared to if the service was not received at that specific point in time).

Still further, and in relation to coordinating a vehicles fleet, by applying the scheme according to the present disclosure it may also be possible to maximize long term fleet operational income with respect to operation failure and/or latest arrival time. Operating income may for example be defined as revenue of goods transportation minus operating costs such as energy consumption.

According to another aspect of the present disclosure, there is provided a control system adapted to operate an autonomous vehicle travelling along a predetermined route using a control system, the predetermined route including a predetermined destination and a previously established time for arrival at the destination, the control system comprising a wireless transceiver and an electronic control unit, wherein the control system is adapted to identify, using the electronic control unit, a service provider arranged within a predetermined distance from the vehicle, the service provider arranged to provide a service to the vehicle for extending a present operational duration, establish, using the wireless transceiver, a networked communication with the service provider, receive, at the electronic control unit, an offer from the service provider to provide the service, estimate, using the electronic control unit, a delay for amending the route to accept the offer from the service provider, and decide, using the electronic control unit, if to accept the offer based on a combination of the present operational duration, the previously established time for arrival and the estimated delay. This aspect of the present disclosure provides similar advantages as discussed above in relation to the previous aspect of the present disclosure.

In a preferred embodiment of the present disclosure, the control system is provided as an on-board component of the vehicle, typically further comprising the above-mentioned sensors. The vehicle may in turn be e.g. one of a bus, a truck, a car, or any form of construction equipment or working machine. Since the vehicle may be one of e.g. a construction equipment or a working machine, the expression road as used above should be interpreted broadly, including any dedicated areas where the vehicle is operating. The vehicle may furthermore be at least one of a pure electrical vehicle (PEV) and a hybrid electric vehicle (HEV).

It should however be understood that the control system possibly may be implemented with e.g. a server arranged remotely from the vehicle. Such a server may for example form part of a so called "control tower" arranged to operate/control a plurality of different vehicles.

According to a further aspect of the present disclosure there is provided a computer program product comprising a non-transitory computer readable medium having stored thereon computer program means for operating a control system adapted to operate an autonomous vehicle travelling along a predetermined route using a control system, the predetermined route including a predetermined destination and a previously established time for arrival at the destination, the control system comprising a wireless transceiver and an electronic control unit, wherein the computer program product comprises code for identifying, using the electronic control unit, a service provider arranged within a predetermined distance from the vehicle, the service provider arranged to provide a service to the vehicle for extending a present operational duration, code for establishing, using the wireless transceiver, a networked communication with the service provider, code for receiving, at the electronic control unit, an offer from the service provider to provide the service, code for estimating, using the electronic control unit, a delay for amending the route to accept the offer from the service provider, and code for deciding, using the electronic control unit, if to accept the offer based on a combination of the present operational duration, the previously established time for arrival and the estimated delay. Also this aspect of the present disclosure provides similar advantages as discussed above in relation to the previous aspects of the present disclosure.

A software executed by the server for operation in accordance to the present disclosure may be stored on a computer readable medium, being any type of memory device, including one of a removable nonvolatile random access memory, a hard disk drive, a floppy disk, a CD-ROM, a DVD-ROM, a USB memory, an SD memory card, or a similar computer readable medium known in the art.

Further advantages and advantageous features of the present disclosure are disclosed in the following description and in the dependent claims.

BRIEF DESCRIPTION OF THE DRAWINGS

With reference to the appended drawings, below follows a more detailed description of embodiments of the present disclosure cited as examples.

In the drawings.

DETAILED DESCRIPTION

Figure 1A:
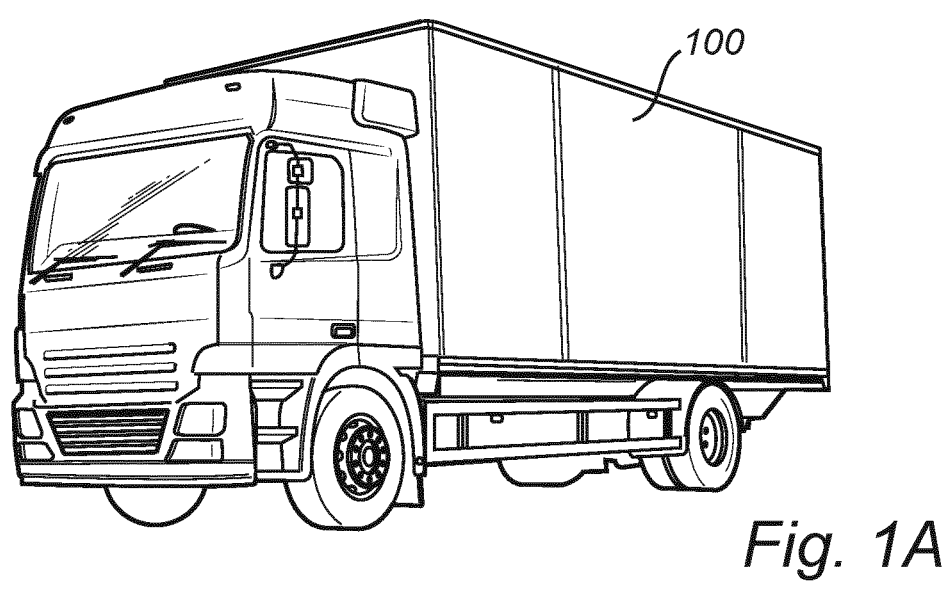
FIG. 1A illustrates a truck, 1B a bus and 1C a wheel loader in which the control system according to the present disclosure may be incorporated.

The present disclosure will now be described more fully hereinafter with reference to the accompanying drawings, in which currently preferred embodiments of the present disclosure are shown. This disclosure may, however, be embodied in many different forms and should not be construed as limited to the embodiments set forth herein; rather, these embodiments are provided for thoroughness and completeness, and fully convey the scope of the disclosure to the skilled addressee. Like reference characters refer to like elements throughout.

Figure 1B:
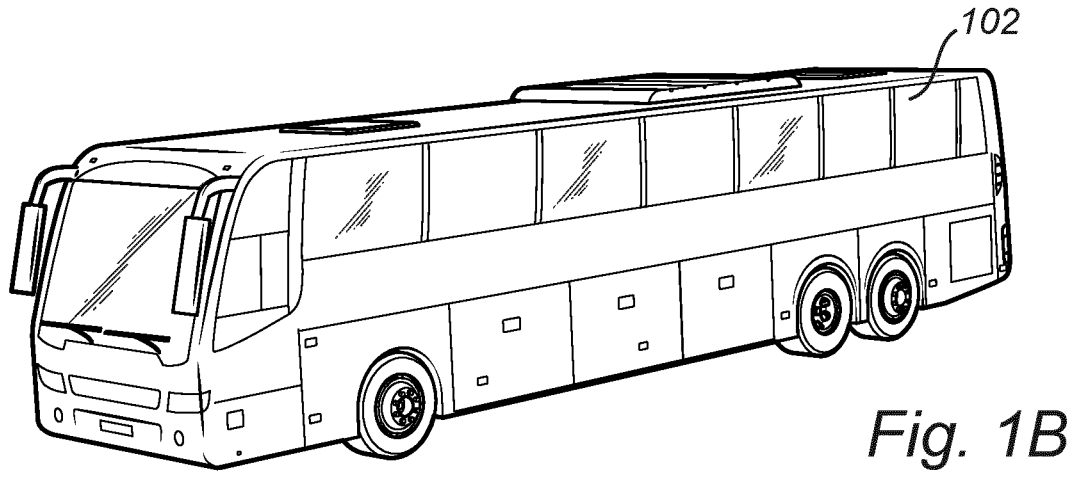
Figure 1C:
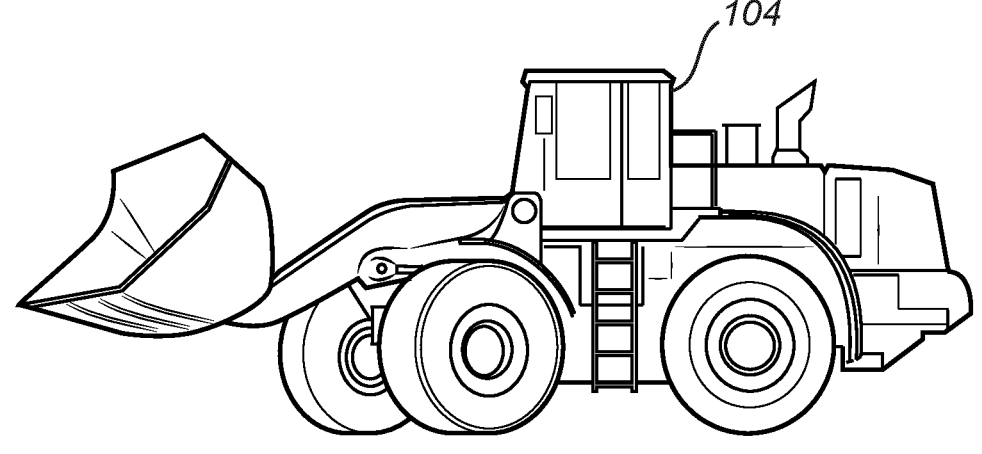
Figure 2:
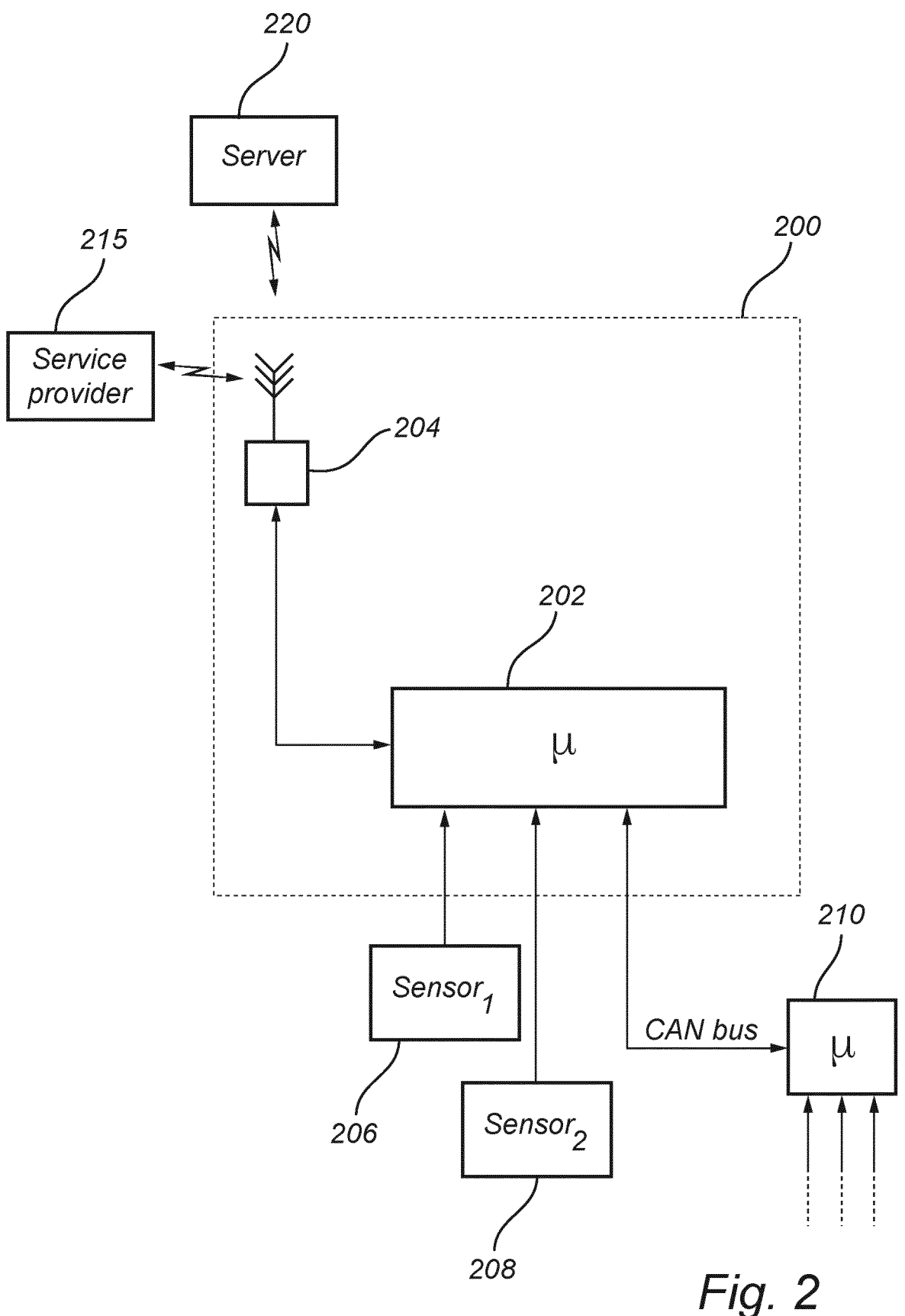
FIG. 2 illustrates a conceptual control system in accordance to a currently preferred embodiment of the present disclosure.

Referring now to the drawings and to FIG. 1A in particular, there is depicted an exemplary vehicle, here illustrated as a truck 100, in which a control system 200 (as shown in FIG. 2) according to the present disclosure may be incorporated. The control system 200 may of course be implemented, possibly in a slightly different way, in a bus 102 as shown in FIG. 1B, wheel loader 104 as shown in FIG. 10, a car, etc.

The vehicle may for example be one of an electric or hybrid vehicle, or possibly a gas, gasoline or diesel vehicle. The vehicle comprises an electric machine (in case of being an electric or hybrid vehicle) or an engine (such as an internal combustion engine in case of being a gas, gasoline or diesel vehicle). The vehicle may further be manually operated, fully or semi-autonomous.

FIG. 2 shows a conceptual and exemplary implementation of the control system 200 according to the present disclosure, typically provided as an onboard component of the vehicle 100, 102, 104. The control system 200 comprises an electronic control unit (ECU) 202 and a transceiver 204, the transceiver connected to the ECU 202.

For reference, the ECU 202 may be manifested as a general-purpose processor, an application specific processor, a circuit containing processing components, a group of distributed processing components, a group of distributed computers configured for processing, a field programmable gate array (FPGA), etc. The processor may be or include any number of hardware components for conducting data or signal processing or for executing computer code stored in memory. The memory may be one or more devices for storing data and/or computer code for completing or facilitating the various methods described in the present description. The memory may include volatile memory or nonvolatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

The ECU 202 is further provided with an interface for allowing communication with e.g. a first 206 and a second 208 sensor generating data relating to e.g. a current operation of the vehicle 100, 102, 104. Such sensors 206, 206 may include anything from fuel level sensors, tire pressure sensors, oil level sensors, etc., generating data that directly may be used for determining if a service (e.g. such as adjusting the tire pressure or the oil level) is needed. Other sensors are of course possible and within the scope of the present disclosure. The determination of if a service is needed may in some embodiments be made by comparing the data from each of the sensors with at least one predetermined threshold. For example, if the tire pressure is below a predetermined threshold it may be necessary to increase the pressure in that tire (or change the tire). A service is thus needed for performing such an action.

The ECU 202 may also be connected, e.g. using a CAN bus (or similar present or future communication means) to e.g. a further ECU 210, where the further ECU 2in turn may be connected to other sensors or by itself adapted to determine if a service is needed for the vehicle.

The ECU 202 may further use the transceiver 204 to communicate with e.g. a service provider 215 (or a plurality of service providers) and/or a server 202. The server 220 may as mentioned above be a mission control server managing e.g. a logistical operation relating to a plurality of vehicles.

The server 102 may in some embodiment be seen as a central "control hub", providing an entity such as a transport provider with means for communicating instructions to the vehicles 100, 102, 106 for transporting a predefined cargo from a pic-up location (start) to a destination, possibly travelling along a route that has been determined by the server 220 to a drop-off location (end).

The communication between the transceiver 204 and the service provider 215 and/or the server 202 may be by means of a network connection, such as using the Internet. In some embodiments the transceiver 204 may for example be adapted for allowing communication using WLAN, CDMA, GSM, GPRS, 3/4/5G mobile communications, or similar. Other present of future wireless communication protocols are possible and within the scope of the present disclosure.

As mentioned above, the control system 200 is preferably provided as an onboard component of the vehicle 100, 102, 104. However, the computation performed in line with the present disclosure may as an alternative be distributed between e.g. computational means comprised with the vehicle 100, 102, 104 and the server 220. Accordingly, the vehicle 100, 102, 104 may be arranged to take independent decision, or make the decisions in conjunction with the server 220.

Figure 3:
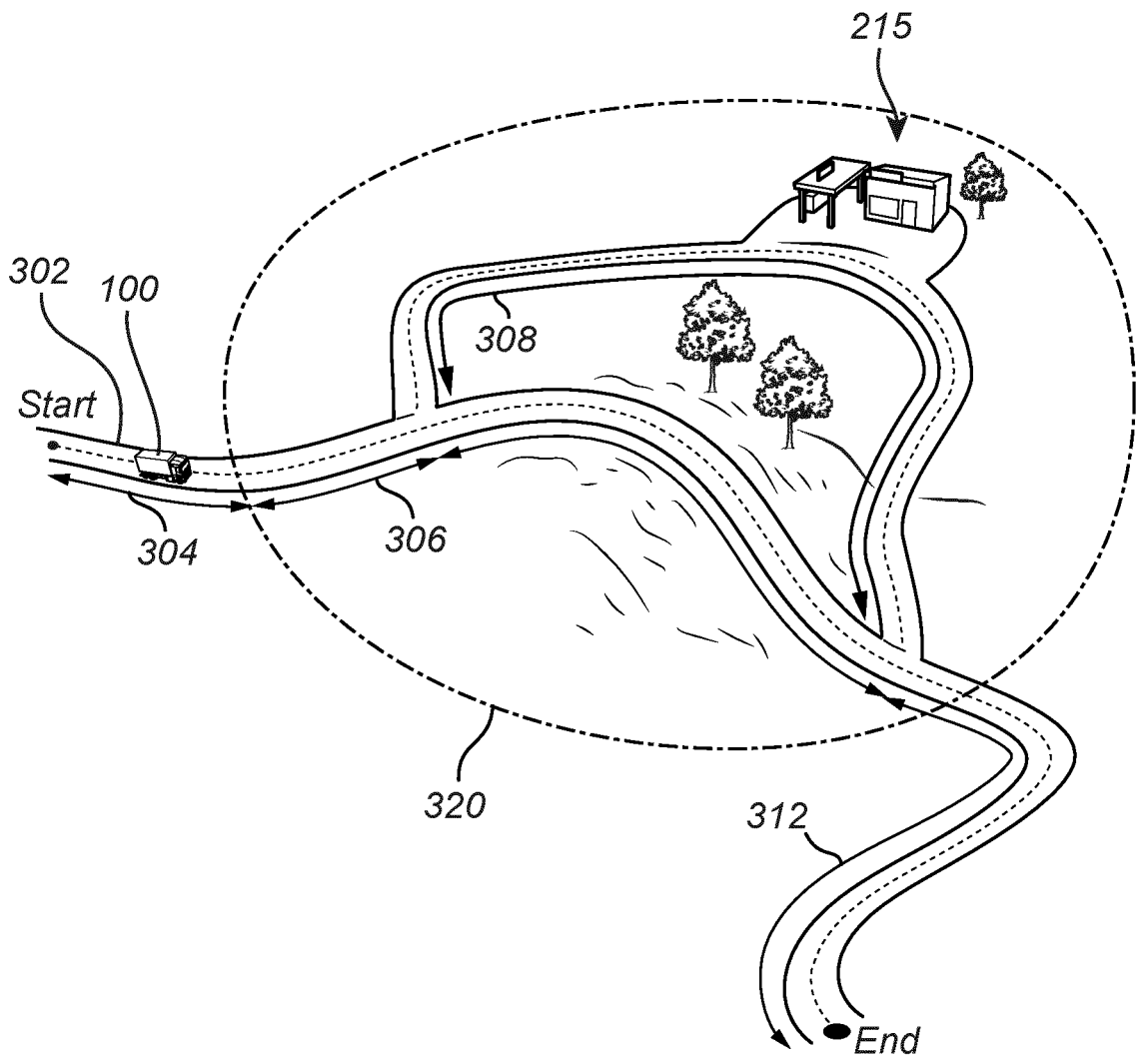
FIG. 3 provides an illustration of the operation of the control system for directing the vehicle to a service provider.

With further reference to FIG. 3, when performing the scheme according to the present disclosure e.g. the vehicle 100 is travelling along a first portion 304 of a route 302. The vehicle 100 has identified that e.g. the first sensor 206 comprised with the vehicle 100 is malfunctioning due to undesirable dirt at a sensing surface of the sensor 206. For example, the sensor 206 may be a camera and the sensor surface may be a lens comprised with the camera. The ECU 202 could possibly have identified that images acquired by the camera have an undesirable quality, being below a normal quality level, and that thus the lens has to be cleaned to again be able to produce images of a normal (and expected) image quality. Accordingly, the ECU 202 has determined that the vehicle is in need of a service, the service in this embodiment being a cleaning service.

As the vehicle 100 travels along the route 302, it gets within a predetermined distance from a service provider 215 and establishes a networked communication with the service provider 215. The predetermined distance may in some embodiments be implemented as a zone 320 surrounding the service provider 215. The vehicle 100 will in turn receive an offer from the service provider 215 to provide the service. The service provider 215 is located such that the vehicle 100 must take a detour to the service provider 215, i.e. the vehicle 100 will be at least slightly delayed if visiting the service provider 215 to receive the service. In FIG. 3 the service provider is a washing station suitable for providing desired cleaning service to the specific type of the vehicle 100.

The vehicle 100 must now decide on if it should accept the offer from the service provider 215. This decision must be taken by the vehicle 100 before the detour to the service provider 215 must be made, in FIG. 3 shown as a second portion 306 of the route 306.

In line with the present disclosure, the decision making is preferably implemented as a machine learning component at the ECU 202. As discussed above, it is advantageous to adapt the machine learning component in such a way that it balances the need of being able to continue to have the vehicle 100 operating while at the same at the same time not arriving too late at the destination (or completing the mission within a predefined time frame).

Generally, the decision is made based on at least present operational duration (e.g. "how long may the vehicle operate without receiving the service"), a previously established time for arrival (e.g. to not arrive too late) and the estimated delay in case the service is accepted.

Accordingly, the machine learning based decision making may for example be implemented such that the decision to not to accept the service shall not introduce an immediate negative reward, i.e. at time $t_{i+1}$. Rather, it may have a more long-term effect. For example, within the scope of the present disclosure it is possible to foresee a situation where a service was not decided for the vehicle 100 even though it was in relative need of this service.

However, when the vehicle 100 again is considered for the service it is in urgent need, but at this point in time it cannot readily receive the service because e.g. another later appearing along the route 302 service provider is blocked by another vehicle. In the context of machine learning, this may be implemented by as assigning a delayed penalty reward for a, in the long run, fault action. In line with such an embodiment, historical data relating to the service provider 215 and the specific road 302 may be used in training the machine learning implemented decision component. It should of course be understood that it also may be possible to include a reward (being the opposite to a penalty) in case the vehicle is arriving in time or at least within the predefined time range. In some implementations of the present disclosure, it may be preferred to train the machine learning component in e.g. a "virtual environment", for allowing sufficient testing and/or simulation before being applied to the vehicle and/or a fleet of vehicles.

Accordingly, in line with the present disclosure it is preferred to provide the machine learning component with adequate training data to learn to balance the short-term service cost with the long-term risk of not accepting the service. Furthermore, it is also preferred to adapt the machine learning component such that it "understands" that a specific service is less favorable, from a fleet perspective, when it risks blocking an after coming vehicle and/or a service is too much risks to put the mission progress at stake.

Based on the above, the ECU 202 makes a decision on if to accept the offer from the service provider 215 and controls the vehicle 100 to selects a detour 308 portion of the route 302. If not accepting the offer, the ECU 202 will control the vehicle 100 to continue along a third portion 310 of the route 302. Independently of if accepting or not accepting the offer from the service provider 215, the vehicle 100 will take the final portion 312 of the route 302 to the predetermined destination.

Figure 4:
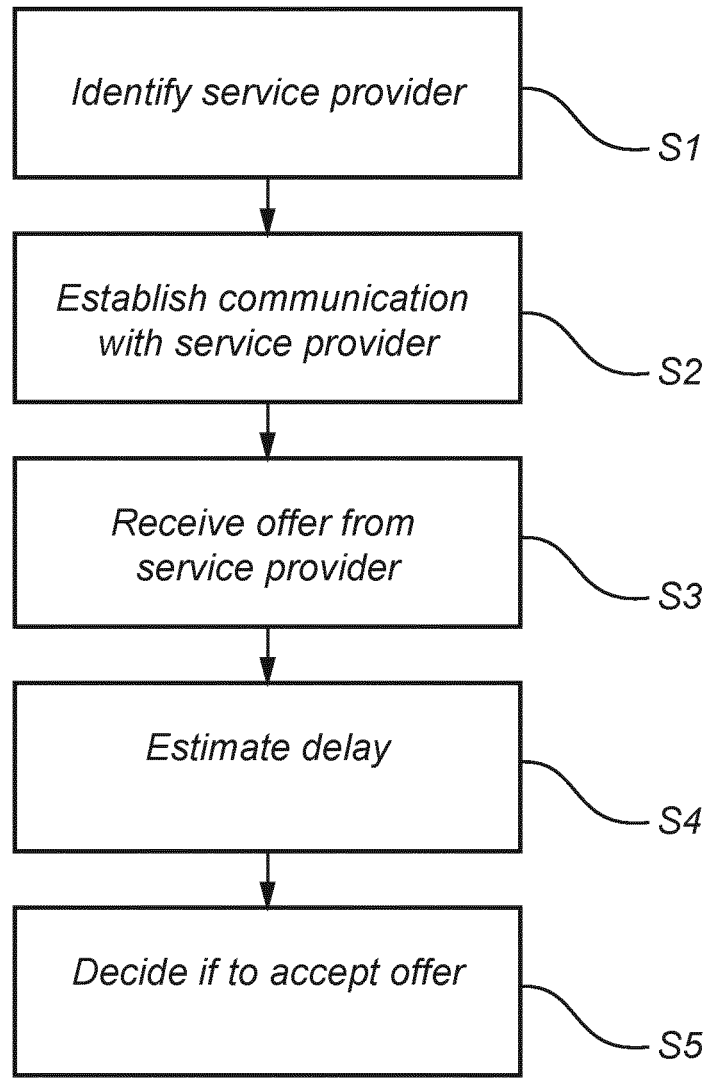
FIG. 4 illustrates the processing steps for performing the method according to the present disclosure.

In summary and with further reference to FIG. 4, the present disclosure relates to a computer implemented method for operating an autonomous vehicle 100, 102, 104, travelling along a predetermined route 302 using a control system 200, the predetermined route 302 including a predetermined destination and a previously established time for arrival at the destination, the control system 200 comprising a wireless transceiver 204 and an electronic control unit 202, wherein the method comprises the steps of identifying, S1, using the electronic control unit 202, a service provider 215 arranged within a predetermined distance from the vehicle 100, 102, 104, the service provider 215 arranged to provide a service to the vehicle 100, 102, 104 for extending a present operational duration, establishing, S2, using the wireless transceiver 204, a networked communication with the service provider 215, receiving, S3, at the electronic control unit 202, an offer from the service provider 215 to provide the service, estimating, S4, using the electronic control unit 215, a delay for amending the route to accept the offer from the service provider 215, and deciding, S5, using the electronic control unit 202, if to accept the offer based on a combination of the present operational duration, the previously established time for arrival and the estimated delay. The present disclosure also relates to a corresponding control system and computer program product.

The present disclosure presents a scheme for matching a "need" for the vehicle 100, 102, 104 (such as e.g. need to be charged, washed, etc.) with an offer from the service provider 215, where the service provider 215 is adapted to fulfill the vehicle needs. The service provider 215 may for example be a charging station, a washing station, a parking spot for the vehicle 100, 102, 104 to pause/park e.g. to not arrive too early at the destination, a station providing general maintenance or service, etc. In line with the present disclosure, the vehicle 100, 102, 104 may preferably be adapted to itself be responsible to ensure that it doesn't end up in a situation where e.g. the battery is (almost) discharged and the charging station is occupied by another vehicle.

The present disclosure contemplates methods, devices and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor.

By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data that cause a general-purpose computer, special purpose computer, or special purpose processing machines to perform a certain function or group of functions.

Although the figures may show a specific order of method steps, the order of the steps may differ from what is depicted. In addition, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps.

Additionally, even though the disclosure has been described with reference to specific exemplifying embodiments thereof, many different alterations, modifications and the like will become apparent for those skilled in the art.

Variations to the disclosed embodiments can be understood and effected by the skilled addressee in practicing the claimed disclosure, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A computer implemented method for operating an autonomous vehicle travelling along a predetermined route using a control system provided as an onboard component of the autonomous vehicle, the predetermined route including a predetermined destination and a previously established time for arrival at the predetermined destination, the control system comprising a wireless transceiver and an electronic control unit (ECU) wherein the method comprises the steps of:

identifying, using the ECU, a service provider arranged within a predetermined distance from the autonomous vehicle, the service provider arranged to provide a service to the autonomous vehicle for extending a present operational duration, establishing, using the wireless transceiver and the ECU, a networked communication with the service provider, receiving, at the ECU, an offer from the service provider to provide the service, estimating, using the ECU, a delay that would result from amending the predetermined route to include a stop at the service provider, deciding, using a machine learning component provided in the ECU, whether to accept the offer from the service provider based on a combination of the present operational duration, the previously established time for arrival, and the estimated delay, wherein the machine learning component has been previously trained on historical data relating to the operation of a population of vehicles, and in response to deciding to accept the offer:

(i) determining, using the ECU, an amended route that includes the stop at the service provider location, and (ii) controlling, using the ECU, the autonomous vehicle to deviate from the predetermined route and follow the amended route including the stop at the service provider, thereby extending the present operational duration for the autonomous vehicle.

2. The method of claim 1, further comprising:

providing, using the wireless transceiver and the ECU, information to the service provider that the offer from the service provider is accepted.

3. The method of claim 2, wherein the information provided to the service provider comprises an estimated time of arrival at the service provider.

4. The method of claim 1, further comprising:

providing, using the wireless transceiver and the ECU, a remotely located server an adjusted time for arrival at the predetermined destination.

5. The method of claim 1, wherein deciding whether to accept the offer from the service provider is further based on an estimated schedule of availability of the service.

6. The method of claim 5, wherein the estimated schedule of availability of the service defines a waiting time for receiving the service.

7. The method of claim 6, wherein the waiting time fluctuates over time.

8. The method of claim 1, wherein the step of deciding whether to accept the offer from the service provider comprises optimizing the operational duration and/or optimizing an arrival time at the predetermined destination.

9. The method of claim 1, wherein the service provider is at least one of a charging station and a washing station for the autonomous vehicle.

10. A control system adapted to operate an autonomous vehicle travelling along a predetermined route using a control system, the predetermined route including a predetermined destination and a previously established time for arrival at the predetermined destination, the control system comprising a wireless transceiver and an electronic control unit (ECU), wherein the control system is provided as an onboard component of the autonomous vehicle and is adapted to:

identify, using the ECU, a service provider arranged within a predetermined distance from the autonomous vehicle, the service provider arranged to provide a service to the autonomous vehicle for extending a present operational duration, establish, using the wireless transceiver and the ECU, a networked communication with the service provider, receive, at the ECU, an offer from the service provider to provide the service, estimate, using the ECU, a delay that would result from amending the predetermined route to include a stop at the service provider, decide, using a machine learning component provided as in the ECU, whether to accept the offer from the service provider based on a combination of the present operational duration, the previously established time for arrival, and the estimated delay, wherein the machine learning component has been previously trained on historical data relating to the operation of a population of vehicles, and in response to deciding to accept the offer:

(i) determine, using the ECU, an amended route that includes the stop at the service provider location, and (ii) control, using the ECU, the autonomous vehicle to deviate from the predetermined route and follow the amended route including the stop at the service provider, thereby extending the present operational duration for the autonomous vehicle.

11. The control system of claim 10, wherein the control system is further adapted to:

provide, using the wireless transceiver and the ECU, information to the service provider that the offer from the service provider is accepted.

12. The control system of claim 11, wherein the information provided to the service provider comprises an estimated time of arrival at the service provider.

13. The control system of claim 10, wherein the control system is further adapted to:

provide, using the wireless transceiver and the ECU, a remotely located server an adjusted time for arrival at the predetermined destination.

14. The control system of claim 10, wherein deciding whether to accept the offer from the service provider is further based on an estimated schedule of availability of the service.

15. The control system of claim 14, wherein the estimated schedule of availability of the service defines a waiting time for receiving the service.

16. The control system of claim 15, wherein the waiting time fluctuates over time.

17. An autonomous vehicle comprising the control system of claim 10.

*   *   *   *   *